Oct. 9, 1923.
M. C. HAZARD
COMBINATION ROPE SOCKET AND JAR
Filed Dec. 29, 1922
1,470,445
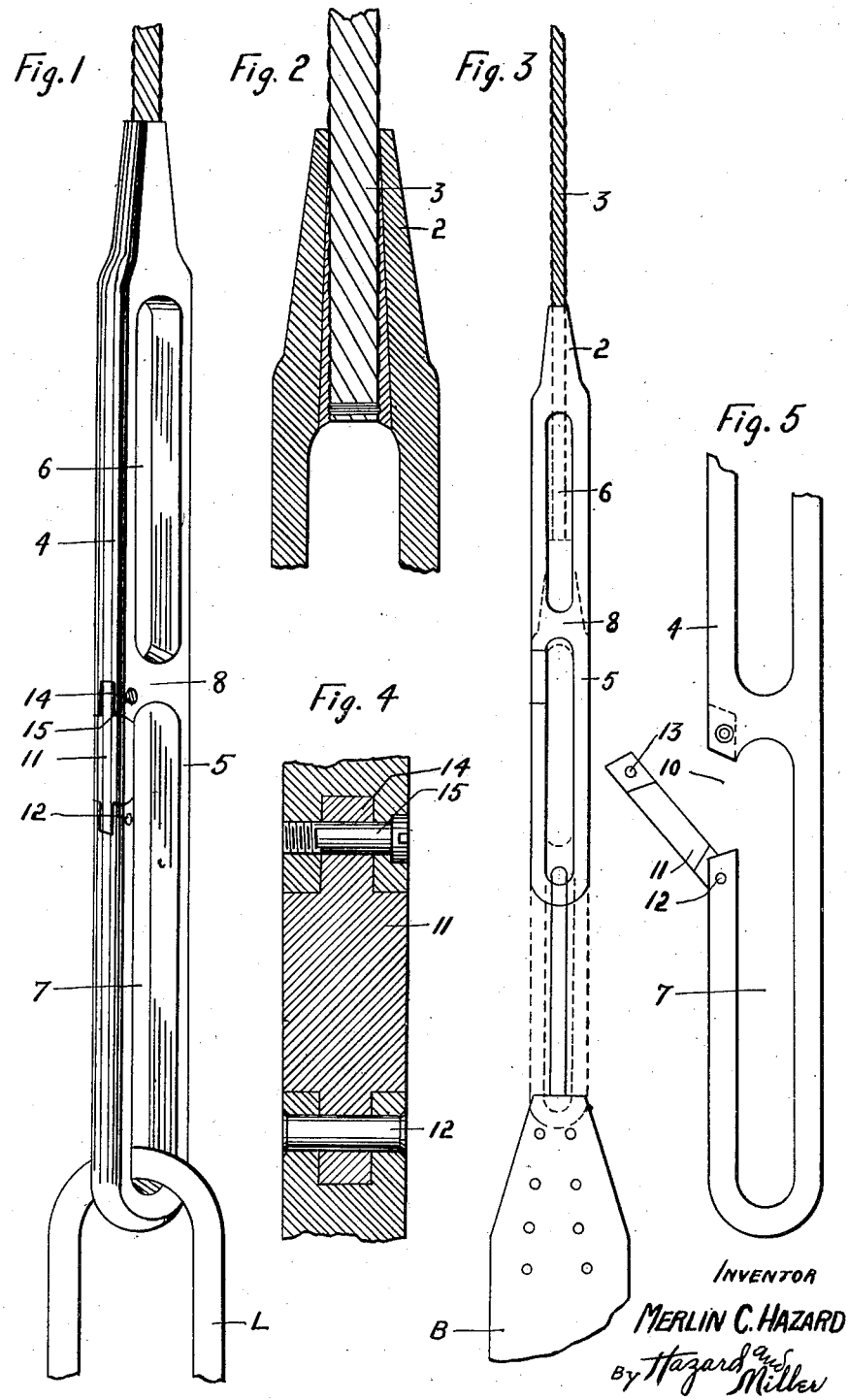

Patented Oct. 9, 1923.

1,470,445

UNITED STATES PATENT OFFICE.

MERLIN C. HAZARD, OF HUNTINGTON BEACH, CALIFORNIA.

COMBINATION ROPE SOCKET AND JAR.

Application filed December 29, 1922. Serial No. 609,619.

*To all whom it may concern:*

Be it known that I, MERLIN C. HAZARD, a citizen of the United States, residing at Huntington Beach, in the county of Orange and State of California, have invented new and useful Improvements in Combination Rope Sockets and Jars, of which the following is a specification.

This invention relates to deep well drilling apparatus, and has for its object to provide a combined rope socket, jar and bail link.

Another object of the invention is to provide a jar link having provision to facilitate fishing operations in the event that the bail or other tools that may be attached to the link become jammed or lost. Another object is to provide a jar link having an openable bail loop receiving end and to provide a jar member having a bail receiving slot and a movable closure therefor whereby the slot may be readily opened and closed to permit the insertion and positive retention of a bail loop.

Other objects and advantages will be made manifest in the following specification of an embodiment of the invention illustrated in the accompanying drawings, wherein—

Figure 1 is a perspective of the improved jar and rope socket device.

Fig. 2 is a sectional detail view showing the attachment of the rope to the socket end of the jar.

Fig. 3 is a side elevation showing the jar in bail lifting position in full lines and showing it in jarring position in dotted lines.

Fig. 4 is a detail sectional view through the closure device and the contiguous ends of the jar slot mouth.

Fig. 5 is a side elevation of the lower end of the jar showing the plug or closure in open position.

The invention is shown as consisting of an elongated link, commonly called a jar, the link having a rope receiving socket 2 at one end in which the rope or cable 3 is adapted to be substantially connected. The link body comprises two sides 4 and 5, these sides being spaced to form upper and lower slots 6 and 7 in alinement on opposite sides of a connecting web 8.

To facilitate attachment of a bail B having a loop L, one side of the jar is provided with a mouth or lateral opening 10 leading into the lower slot 7. While it is desirable to provide a jar having an open mouth slot for the application of the loop of the bail, it is further desirable to provide a means for closing the mouth of the bail receiving slot so as to prevent the accidental dislodgment of the bail loop from the jar slot. To that end I provide a closure for the mouth slot 10, this closure consisting of a plug or filler 11, the lower end of which is pivoted at 12 to the contiguous side bar of the slot 7. The upper end of the filler is perforated at 13 and is also reduced in thickness so as to enter a lateral recess 14 provided therefor as in the end of the transverse web 8 which is perforated to receive a fastening screw bolt or other device 15 adapted to be passed through the eye 13 of the filler 11 when the same is closed after the bail loop L has been inserted.

The jar, as thus constructed, is adapted for the ready attachment and detachment of the bail, and, furthermore by the provision of the upper slot 6 in the jar, the fishing out of the same will be facilitated in cases of necessity, since the grappling of the fishing appliance is facilitated by the provision of the fishing aperture or hole 6 at the upper end of the jar.

Further embodiments, modifications and variations may be resorted to within the spirit of the invention as here claimed.

What is claimed is:

A combined rope socket and jar comprising an elongated body structure having in its lower portion an elongated slot with a lateral mouth at its upper end, the slot being unobstructed from end to end and forming on one side below the said mouth an elongated link-receiving hook, a closure piece pivoted at its lower end on the upper end of the hook and adapted to be closed into the mouth, the upper lip of the mouth being provided with a socket to receive the inserted end of the closure, and a fastening member passing through the socket and inserted closure end.

In testimony whereof I have signed my name to this specification.

M. C. HAZARD.